US010559022B2

(12) United States Patent
Conchola et al.

(10) Patent No.: US 10,559,022 B2
(45) Date of Patent: Feb. 11, 2020

(54) ACCOUNT CREATION OVERLAY

(71) Applicant: Target Brands, Inc., Minneapolis, MN (US)

(72) Inventors: Joseph A. Conchola, Minneapolis, MN (US); Liping Vong, Minneapolis, MN (US); Richard Anthony Hultman, Edina, MN (US)

(73) Assignee: Target Brands, Inc., Minneapolis, MN (US)

( * ) Notice: Subject to any disclaimer, the term of this patent is extended or adjusted under 35 U.S.C. 154(b) by 1300 days.

(21) Appl. No.: 14/562,063

(22) Filed: Dec. 5, 2014

(65) Prior Publication Data

US 2016/0162977 A1 Jun. 9, 2016

(51) Int. Cl.
*G06Q 30/06* (2012.01)
*G06Q 20/12* (2012.01)
*G06Q 20/32* (2012.01)

(52) U.S. Cl.
CPC ......... *G06Q 30/0633* (2013.01); *G06Q 20/12* (2013.01); *G06Q 20/322* (2013.01)

(58) Field of Classification Search
CPC ... G06Q 30/0633; G06Q 20/12; G06Q 20/322
USPC ...................................................... 705/26.8
See application file for complete search history.

(56) References Cited

U.S. PATENT DOCUMENTS

| | | | | |
|---|---|---|---|---|
| 7,899,710 B1 * | 3/2011 | Walker | ............... | G06Q 30/0224 705/14.54 |
| 8,171,432 B2 * | 5/2012 | Matas | .................. | G06F 3/0482 715/776 |
| 8,548,872 B1 * | 10/2013 | Gupta | ................ | G06Q 30/0206 705/26.1 |
| 8,560,401 B1 * | 10/2013 | Bharara | ................ | G06Q 30/00 705/26.1 |
| 2007/0078727 A1 * | 4/2007 | Spiegel | .................. | G06Q 30/06 705/26.8 |
| 2009/0150262 A1 * | 6/2009 | Mizhen | .................. | G06Q 20/12 705/26.1 |

(Continued)

OTHER PUBLICATIONS

Anonymous, Bunion Bootie Makes It Even Easier to Purchase Online! Now You Can Pay Easily With Your Credit Card, Jul. 11, 2012, Vocus PRW Holdings, 3BNR, p. 1. (Year: 2012).*

(Continued)

*Primary Examiner* — Jason B Dunham
*Assistant Examiner* — Brittany E Bargeon
(74) *Attorney, Agent, or Firm* — Westman, Champlin & Koehler, P.A.; Theodore M. Magee

(57) ABSTRACT

A computer-implemented method displays a shopping cart user interface showing an electronic shopping cart for an anonymous user and receives an input indicating a selection of a sign-in control. An overlay is displayed over the shopping cart user interface such that a portion of the shopping cart user interface is displayed through the overlay and the overlay provides text inputs to receive information for creating a user account. An indication that a user wishes to submit information in the text inputs to create a user account is received. The text inputs are submitted to a server and an indication that the user account was created is received. An indication that the user account was successfully created is displayed within the overlay.

15 Claims, 13 Drawing Sheets

(56) References Cited

U.S. PATENT DOCUMENTS

| | | | | |
|---|---|---|---|---|
| 2010/0257210 | A1* | 10/2010 | Witkin | G06F 17/30274 707/802 |
| 2011/0271181 | A1* | 11/2011 | Tsai | G06F 3/04883 715/702 |
| 2012/0072271 | A1* | 3/2012 | Dessert | G06Q 30/02 705/14.1 |
| 2012/0123865 | A1* | 5/2012 | Salzano | G06Q 30/0257 705/14.55 |
| 2012/0150666 | A1* | 6/2012 | Savic | G06Q 30/0277 705/14.73 |
| 2012/0233020 | A1* | 9/2012 | Eberstadt | G06Q 10/10 705/26.41 |
| 2013/0132246 | A1* | 5/2013 | Amin | G06Q 40/10 705/34 |
| 2014/0143151 | A1* | 5/2014 | Dhar | G06Q 20/10 705/44 |
| 2014/0304646 | A1* | 10/2014 | Rossmann | G06F 3/0482 715/790 |
| 2015/0128023 | A1* | 5/2015 | Goldstein | G06F 16/957 715/234 |
| 2015/0154686 | A1* | 6/2015 | Lawrence | G06Q 30/0633 705/26.8 |

OTHER PUBLICATIONS

Webpage, Modal Popup with Create New Account Controls, http://forums.asp.net/t/1217861.aspx?Modal+Popup+with+Create+New+account+Controls, Feb. 17, 2008, 3 pages.

Webpage, Display Message in a Popup Window with Greyed Out Background, http://forums.phpfreaks.com/topic/250431-display-message-in-a-popup-window-with-greyed-out-background/, Nov. 4, 2011, 2 pages.

Webpage, Grey out Background—Pop up, http://www.webdeveloper.com/forum/showthread.php?245578-Grey-out-background-pop-up, Apr. 2011, 3 pages.

Webpage, Eric Martin, Simple Modal Demos, http://www.ericmmartin.com/projects/simplemodal-demos/, 12/5/147, 3 pages.

Webpage, Patrick Burt, How to Do a CSS Popup without Opening a New Window, http://www.pat-burt.com/web-development/how-to-do-a-css-popup-without-opening-a-new-window/, Oct. 12, 2007, 101 pages.

* cited by examiner

ACCOUNT CREATION OVERLAY

BACKGROUND

Many on-line shopping sites permit a user to create an account at the site so that the user can track their purchases and so that the user can receive certain offers and credits from the retailer based on their total purchases over time. In order for a purchase to be associated with the user's account, the user must first create the account and then sign-in under the account before completing a purchase.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method displays a shopping cart user interface showing an electronic shopping cart for an anonymous user and receives an input indicating a selection of a sign-in control. An overlay is displayed over the shopping cart user interface such that a portion of the shopping cart user interface is displayed through the overlay and the overlay provides text inputs to receive information for creating a user account. An indication that a user wishes to submit information in the text inputs to create a user account is received. The text inputs are submitted to a server and an indication that the user account was created is received. An indication that the user account was successfully created is displayed within the overlay.

A processor performs steps of receiving an input indicating a selection of a sign-in control while displaying a base user interface and displaying an overlay over the base user interface such that a portion of the base user interface is displayed through the overlay and the overlay comprises visible text inputs to receive information for creating a user account and hidden indications that a user account was successfully created. An indication that a user wishes to submit information in the text inputs to create a user account is received and the text inputs are submitted to a server. An indication that the user account was created is received and the overlay is altered such that the text inputs are hidden and the indications that a user account was successfully created are visible.

In accordance with a further embodiment, a user interface having a sign-in accordion and a create account accordion are displayed such that the sign-in accordion is open and the create account accordion is closed. An indication that a user has selected a control to open the create account accordion is received and in response the sign-in accordion is closed and the create account accordion is opened. An indication that a user has selected a control in the create account accordion to submit account information entered in the create account accordion to a server is received and in response the account information is sent to the server. A response from the server is received indicating that a new account has been created and a message is shown in the create account accordion indicating that the new account has been successfully created.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments described below provide user interfaces that include an overlay that appears over a shopping cart page. An overlay is a partially transparent element that is displayed over the shopping cart page such that a portion of the shopping cart page is still visible. Within the overlay, a user is able to either sign-in or create a new account. After submitting the account information for creating an account, the overlay remains in sight and if the account is created successfully, a message indicating the successful creation of the account is displayed within the overlay in place of the text boxes used to collect the account information. This provides feedback to the user that they have successfully created a new account without disorienting the user by taking them to a new page to show the successful creation of the new account. A button is provided with the success message that will cause the underlying shopping cart page to be reloaded from the server. If the button is not pressed within a set amount of time, the underlying shopping cart page is automatically reloaded from the server.

The embodiments described below address a number of problems associated with creating a new account during the checkout process on a website page. During checkout, the user must confirm their order, select a shipping address, and designate a mode of payment, typically by entering credit card information. It can be difficult for users to track where they are in this checkout process. Creating an account on the website can feel like an extra step to the user that distracts them from their primary goal of completing the sales transaction. In the past, creating such accounts required that the user be redirected to a different page that is separate from the checkout. The user would then have to find their way back to the shopping cart page to continue with the checkout. Thus, under the prior art, users sometimes became disoriented as to where they were in the checkout process and were not sure of how to get back to the shopping cart page.

In addition, users were not always sure that they had successfully created a new account.

Figure 1:
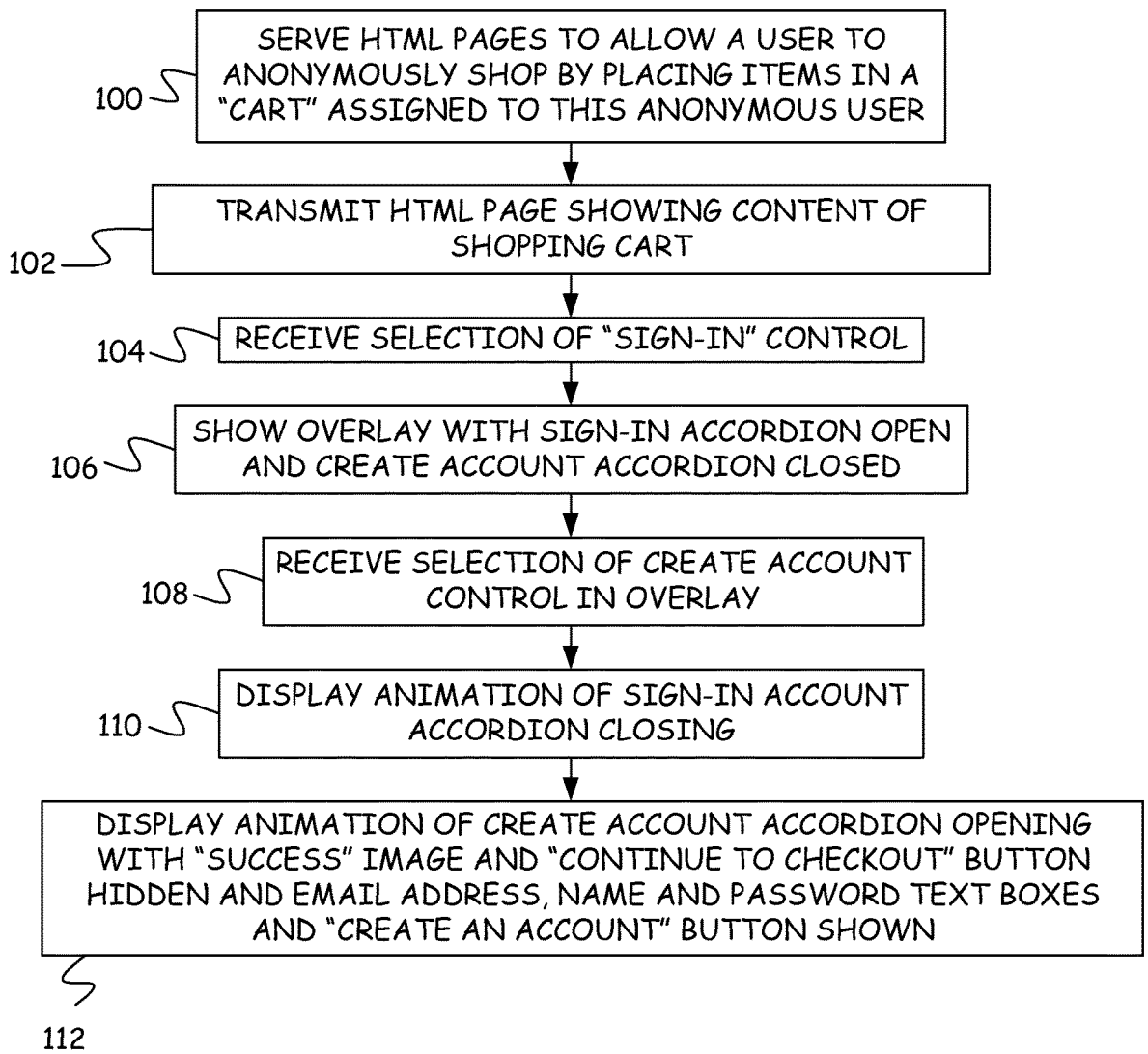
FIG. 1 is a flow diagram for displaying a create-account control in an overlay.
Figure 2:
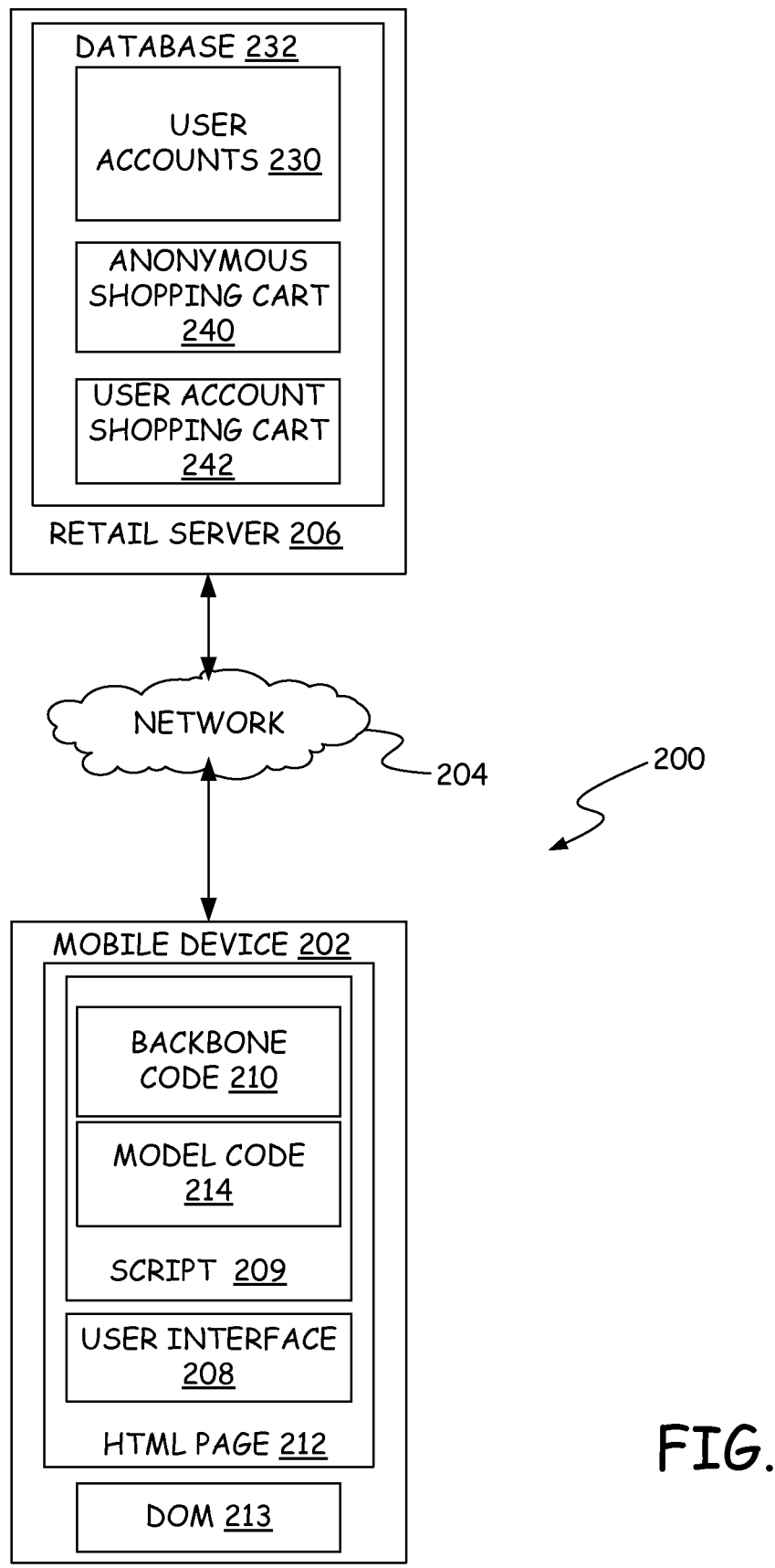
FIG. 2 is a block diagram of a network environment.

FIG. 1 provides a flow diagram of a method of displaying an overlay containing create-account input boxes. FIG. 2 provides a block diagram of a network environment in which the method of FIG. 1 may be practiced.

In step 100 of FIG. 1, a retail server 206 serves one or more hyper-text markup language (html) pages 212 to a mobile device 202 to allow a customer to anonymously shop online. Html pages 212 include scripts 209 and user interface 208. Scripts 209 can include embedded scripts and references to external script files. In some embodiments, scripts 209 take the form of external script files that are referred to as backbone code 210 and model code 214. Scripts 209 contain computer-readable instructions that are executed by mobile device 202 to perform functions. User interface 208 contains markup language instructions that describe the content and layout of a user interface to be shown on a display of mobile device 202. Although pages 212 are designated as html pages, the pages may be written in any language that allows code within the pages to be executed and user interfaces defined within the pages to be rendered. In some embodiments, as part of rendering an html page 212, mobile device 202 constructs a document object model (DOM) 213. DOM 213 describes the contents of user interface 208 as a tree structure. Scripts 209 can traverse the tree structure to retrieve attributes and properties of elements in user interface 208 such as values that have been input by the user. In addition, scripts 209 can modify DOM 213 to add and remove elements. Since mobile device 202 uses DOM 213 to render the user interface, such changes to DOM 213 result in changes to the rendered user interface.

Figure 3:
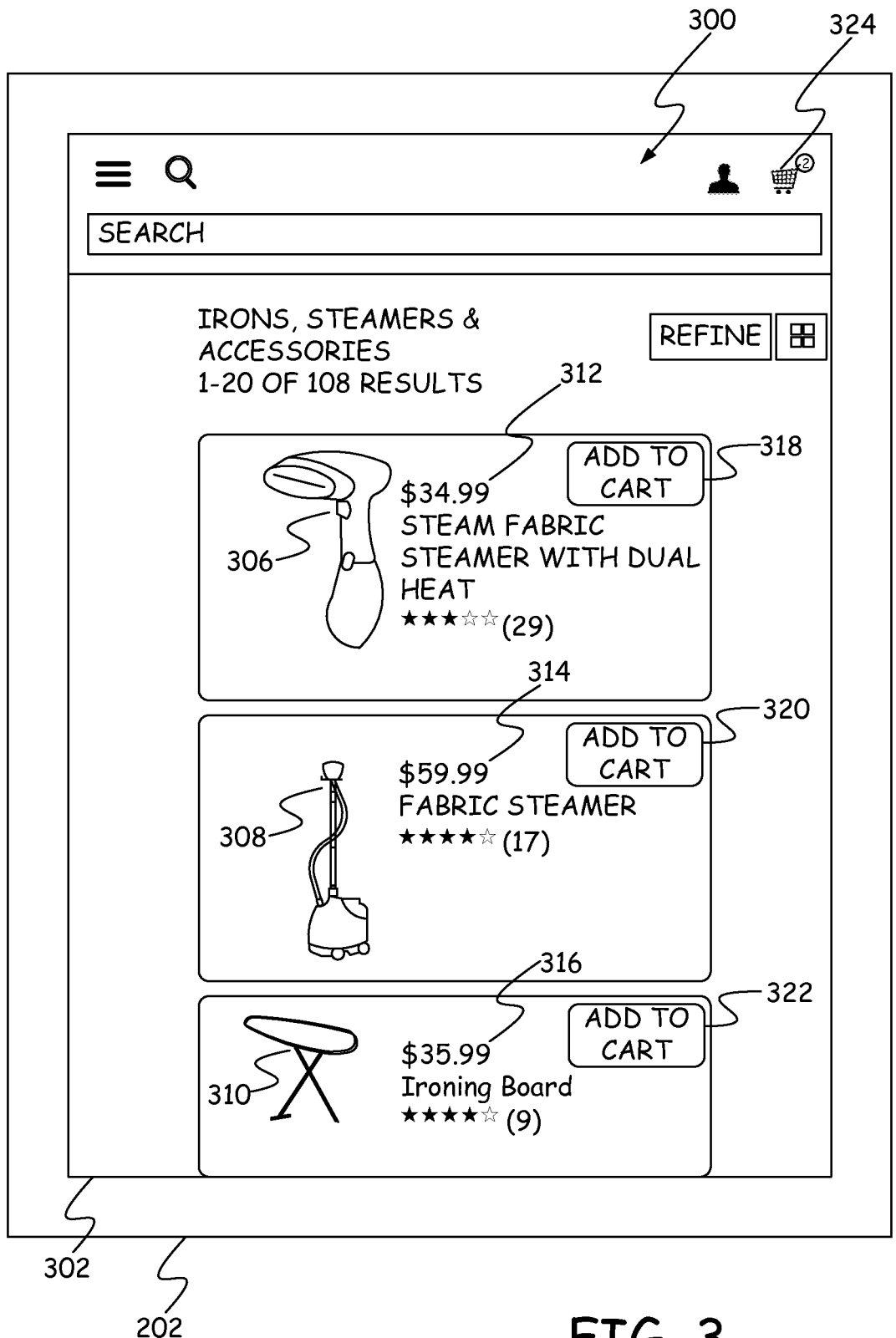
FIG. 3 is an example of a user interface used for mobile shopping.

FIG. 3 provides an example of a rendered html shopping page 300 depicted on a display 302 of mobile device 202. Shopping page 300 includes images of items for sale including images 306, 308 and 310 as well as prices 312, 314 and 316 for those items. Each item includes an add-to-cart button such as add-to-cart buttons 318, 320 and 322, which when selected, cause the corresponding item to be added to an electronic shopping cart 240 that has been assigned to an anonymous guest ID associated with mobile device 202. In this context, the customer using mobile device 202 is anonymous because they have not provided sign-in credentials which would allow retail server 206 to identify the user. Instead, retail server 206 assigns an anonymous identifier to the user and associates the anonymous identifier with a session ID that is tied to the interactions between mobile device 202 and retail server 206.

Figure 4:
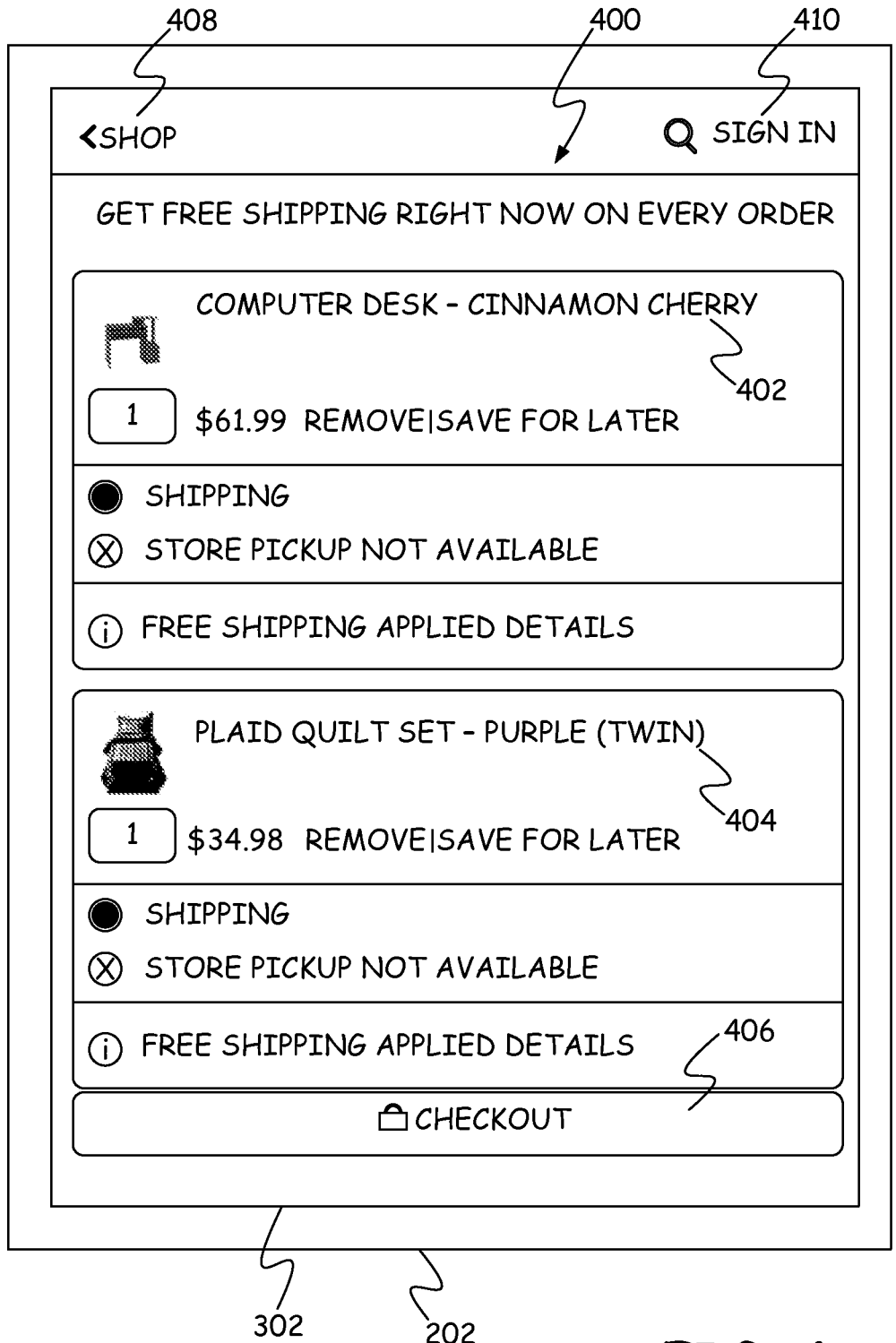
FIG. 4 is an example of an electronic shopping cart user interface.

From shopping page 300, a user is able to select shopping cart control 324 in order to view the contents of the shopping cart at step 102. FIG. 4 provides an example of a shopping cart user interface 400, also referred to as a base user interface 400, shown on display 302 of mobile device 202. In accordance with one embodiment, shopping cart user interface 400 is provided over a secure connection such as HTTPS. Shopping cart user interface 400 shows an electronic shopping cart for an anonymous user that includes a list of items currently in the electronic shopping cart such as items 402 and 404. Shopping cart user interface 400 also includes a checkout button 406, a return to shop button 408 and a sign-in control 410. Checkout button 406 allows the user to proceed to checkout pages where a shipping address and payment information may be entered by the user. Return to shopping control 408 returns the user to the previous shopping page.

Figure 5:
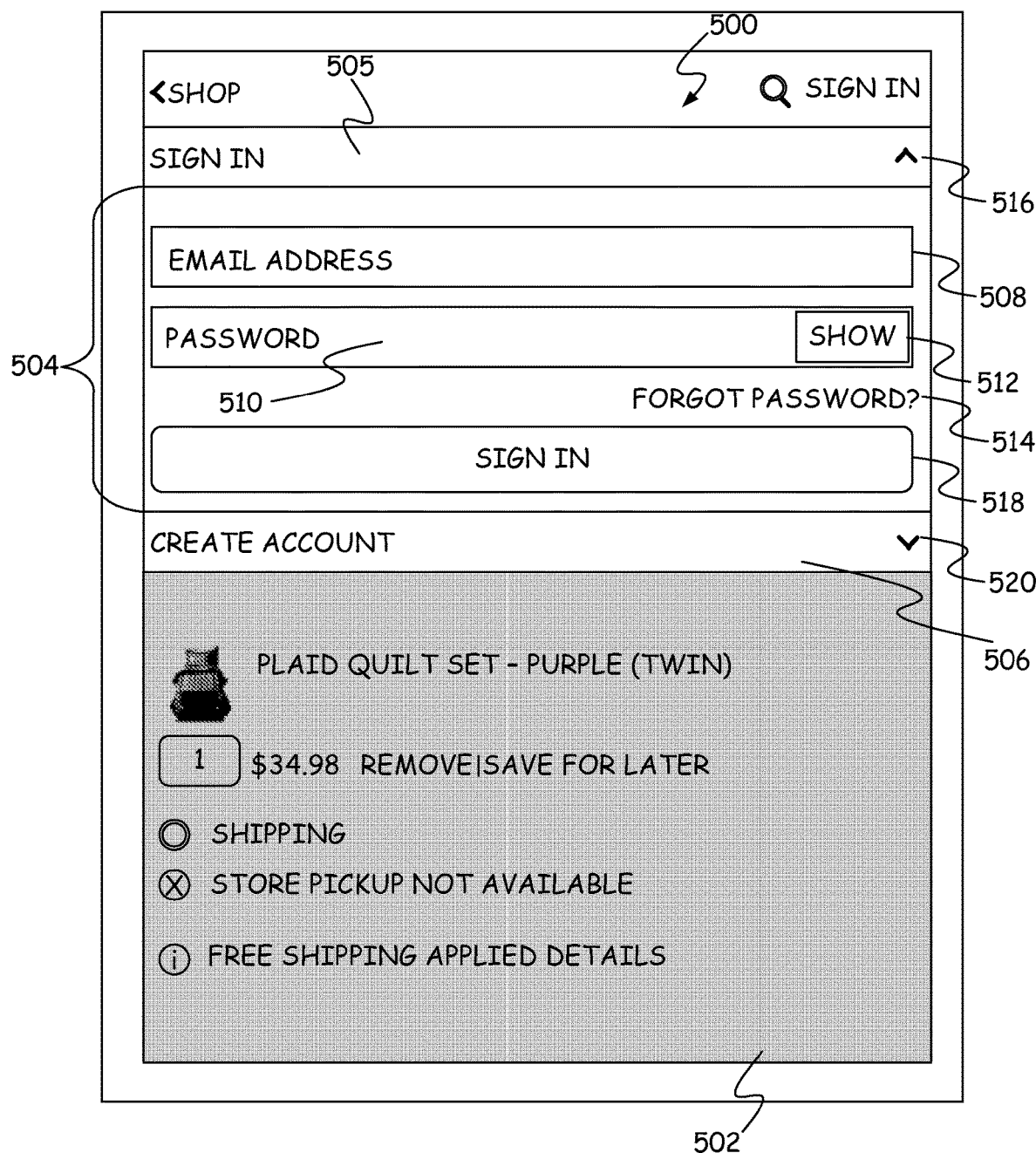
FIG. 5 is an example of a sign-in overlay over a shopping cart user interface.

At step 104, the selection of sign-in control 410 is received and at step 106, in response to receiving the selection of sign-in control input 410, mobile device 202 displays an overlay 500 over shopping cart page 400 as shown in FIG. 5. Overlay 500 includes a semi-transparent region 502 that allows portions of shopping cart page 400 to continue to be viewed, a create account header 506, and a sign-in accordion 504 with a sign-in header 505. When overlay 500 is shown in step 106, sign-in accordion 504 is open as depicted in FIG. 5 such that email textbox 508 and password textbox 510 are viewable as well as SHOW password control 512 and forgot password link 514. In addition, sign-in accordion control 516 is depicted as pointing upward and when selected, will cause sign-in accordion 504 to close with create account header 506 moving up to be directly below sign-in header 505.

If a user has a user account on the retail server 206, they may enter their email address and password for that user account in email address textbox 508 and password textbox 510, respectively. The user may then select sign-in control 518 to submit their email address and password in a request to sign-in to retail server 206.

Figure 6:
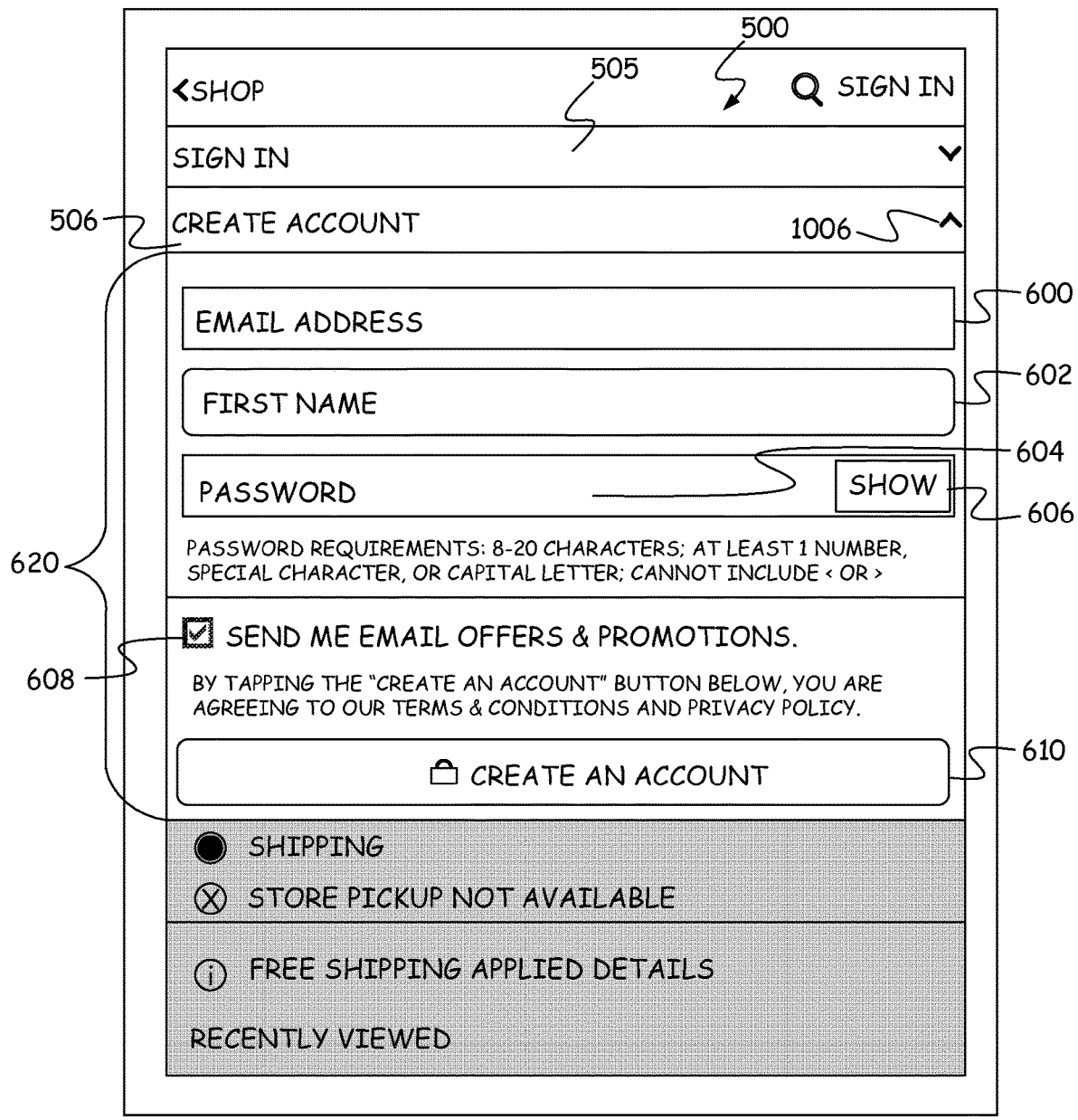
FIG. 6 is an example of the overlay user interface of FIG. 5 with the create account accordion open.

Create account header 506 includes accordion control 520, which is depicted as pointing downward in FIG. 5. At step 108, a user selects accordion control 520 in order to open a create account accordion. When accordion control 520 is selected, an animation is displayed at step 110 showing the closing of sign-in accordion 504 as create account header 506 moves upward to a position just below sign-in header 505. At step 112, an animation is displayed showing a create account accordion 620 opening. FIG. 6 provides an example of overlay 500 with sign-in accordion 504 closed and create account accordion 620 open. In its open state, create account accordion 620 includes text inputs to receive information for creating a user account such as email address input box 600, first name input box 602, and password input box 604. In addition, create account accordion 620 includes SHOW password control 606, offer selection control 608 and create account control 610. A control 1006 is also provided for closing create account accordion 620 to thereby hide input boxes 600, 602 and 604.

Create account accordion 620 also includes hidden indications that a user account was successfully created. These hidden indications are not visible in FIG. 6 because one or more attributes such as a display attribute or a visibility attribute of the indications are set such that mobile device 202 does not render the indications that the user account was successfully created in FIG. 6. However, the indications are present in script 209, and as such were downloaded to mobile device 202 when the html page for the shopping cart was downloaded. By having the indication that a user account was successfully created hidden but present in script 209, it is possible to quickly display the indication of a successfully created user account without redirecting the user to another page simply by changing an attribute of the indication within DOM 213.

Because mobile devices typically have small screen sizes, it is common to redirect users to a new page when creating a user account. This allows the entire screen to be used for creating the user account. However, redirecting the user to a new page can be disorienting to users. As shown in FIG. 6, semi-transparent region 502 is still present when create account accordion 620 is opened such that a portion of the shopping cart user interface is displayed through overlay 500. As such, when entering information to create a new account, the user is reminded of where they are in the checkout process because they can still see part of their shopping cart.

Figure 7:
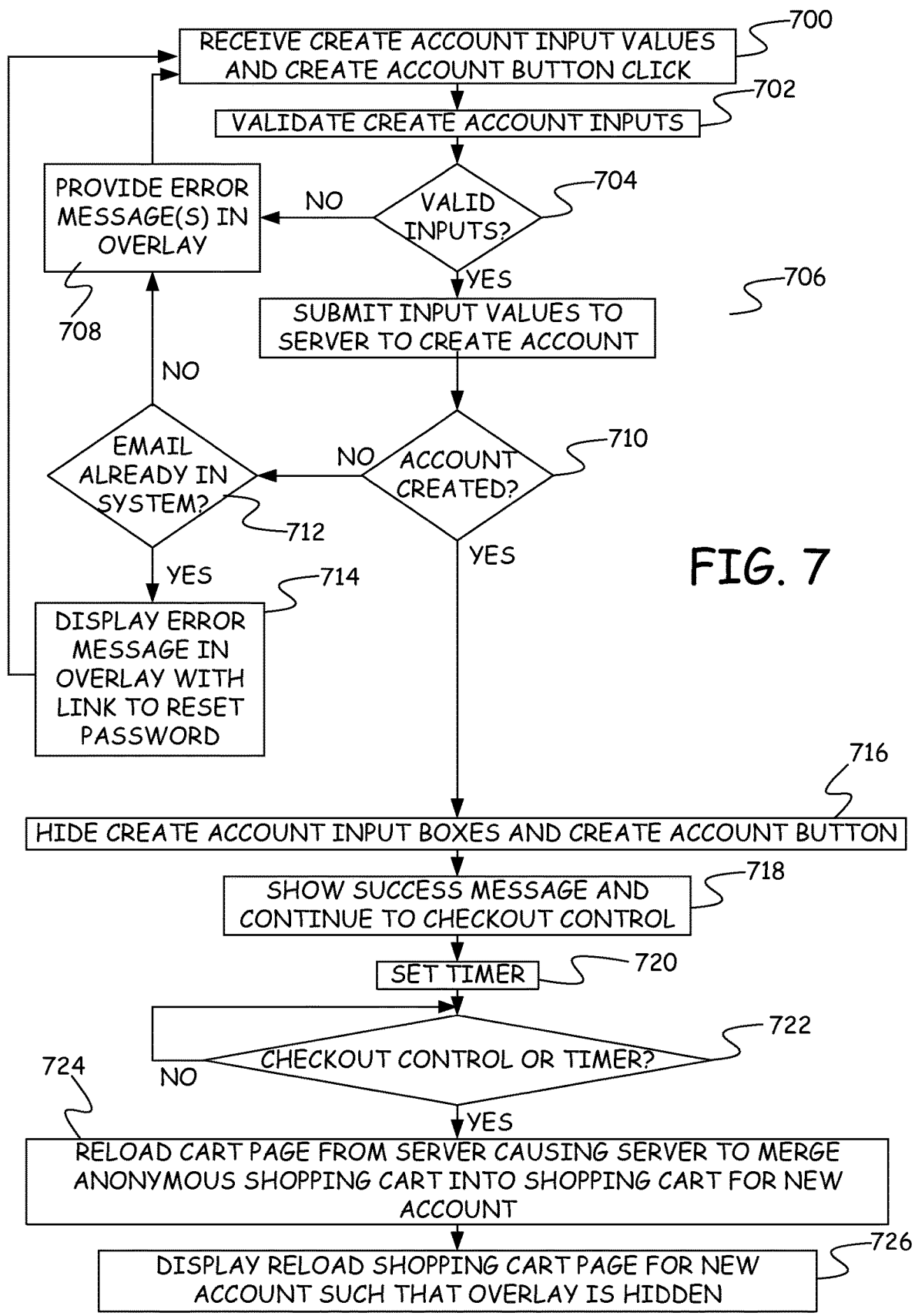
FIG. 7 is a flow diagram for processing create-account input values.

If a user wishes to create a new account using create account accordion 620 of overlay 500, the process of FIG. 7 is utilized. In step 700, the user enters information into email address input box 600, first name input box 602 and password input box 604. The user may also check or uncheck box 608 to indicate whether they wish to receive email offers and promotions. The user then selects CREATE AN ACCOUNT button 610 to indicate that the user wishes to submit the information in the input boxes 600, 602 and 604 to create a user account. Backbone code 210 (FIG. 2) associated with overlay 500 receives the text input in input boxes 600, 602 and 604 and the CREATE AN ACCOUNT button selection or "click" at step 700 of FIG. 7. At step 702, backbone code 210 validates the create account inputs to ensure that a value is provided for each input and that the inputs meet a minimum formatting requirement. For example, password input box 604 is validated to ensure that it has between 8 to 20 characters with at least one number, special character or capital letter and does not include either "<" or ">". In some embodiments, model code 214 defines the valid text inputs and backbone code 210 uses model code 214 to determine if the input is valid.

Figure 8:
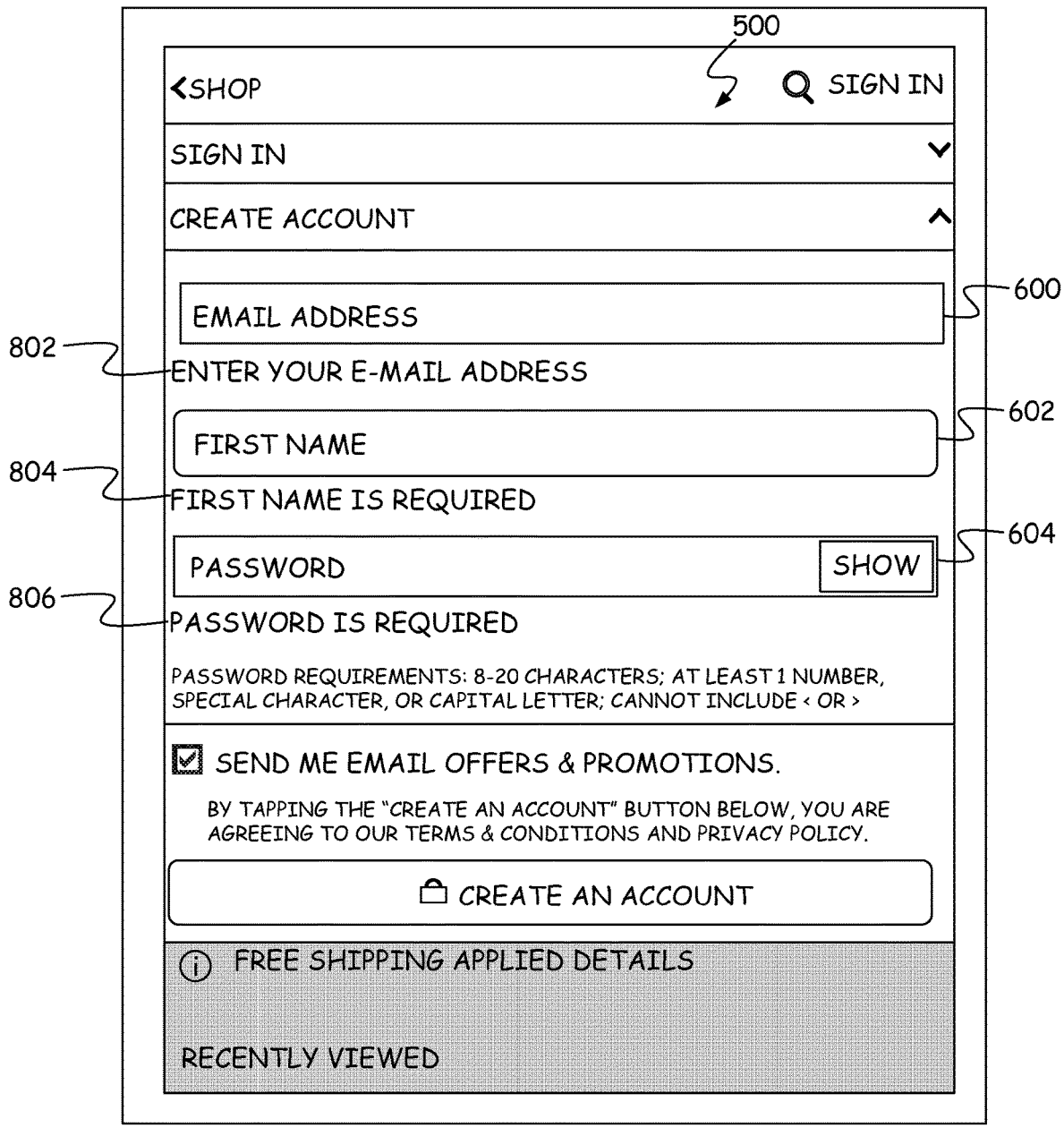
FIG. 8 is an example of the overlay of FIG. 6 showing error messages for the create account accordion.

If at step 704, one or more of the text input boxes does not include valid inputs, backbone code 210 continues at step 706 where it updates overlay 500 to include error messages. FIG. 8 provides an example of overlay 500 with error messages 802, 804 and 806 indicating that text boxes 600, 602 and 604 did not include valid inputs.

If valid inputs have been provided at step 704, backbone code 210 continues at step 708 where it submits the create account input values to server 206. Retail server 206 examines user accounts 230 in database 232 to determine if the email address provided in email address textbox 600 is associated with an existing user account in user accounts 230. If there is an existing user account with that email address, retail server 206 returns an error message indicating the existence of a user account with that email address thereby indicating that a new user account has not been created. If a new user account was not created at step 710, backbone code 210 determines if the error code returned by retail server 206 indicates that the email address provided in the email address input was already present in user accounts 230 at step 712. If the error code does not indicate that the email address was already in the system, but indicates some other error, an appropriate error message is provided in the overlay at step 706 and the process returns to step 700 to receive new input values. If the email address was already in the system at step 712, an error message is displayed that indicates this at step 714 along with a link to reset the password associated with that email address.

Figure 9:
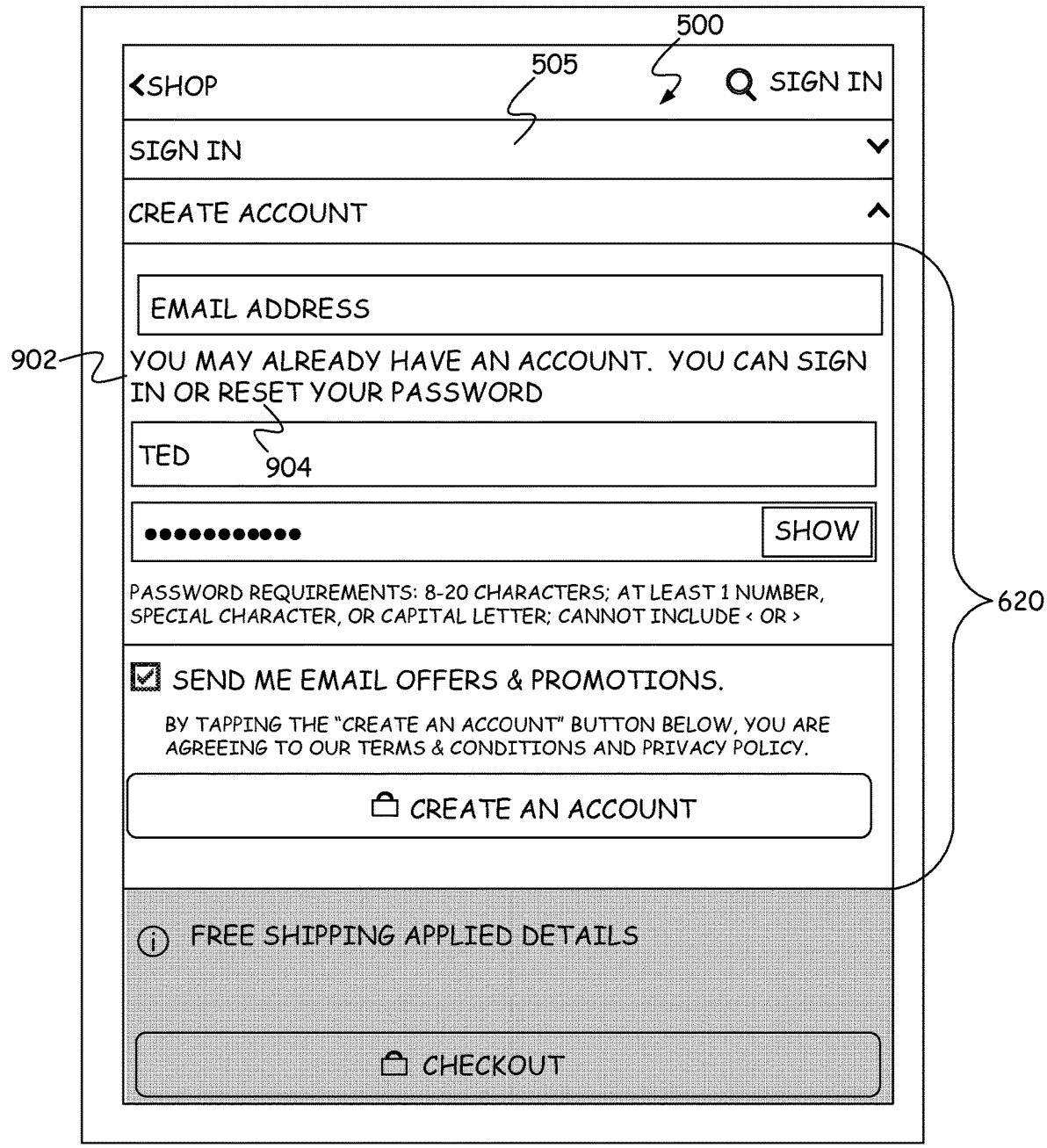
FIG. 9 is an example of the overlay of FIG. 6 showing an error message indicating that the server returned an error when creating an account.

FIG. 9 provides an example of a user interface in which the error message of step 714 is displayed as message 902 in overlay 500. Message 902 indicates that the user may already have an account and suggests to the user that they can sign-in using their account or can reset their password using RESET YOU PASSWORD link 904. After step 714, the process returns to step 700 if the user does not select RESET YOUR PASSWORD link 904. If the user selects RESET YOUR PASSWORD link 904, an email message is sent to the email address previously provided in email textbox 600 allowing the user to change their password.

Figure 10:
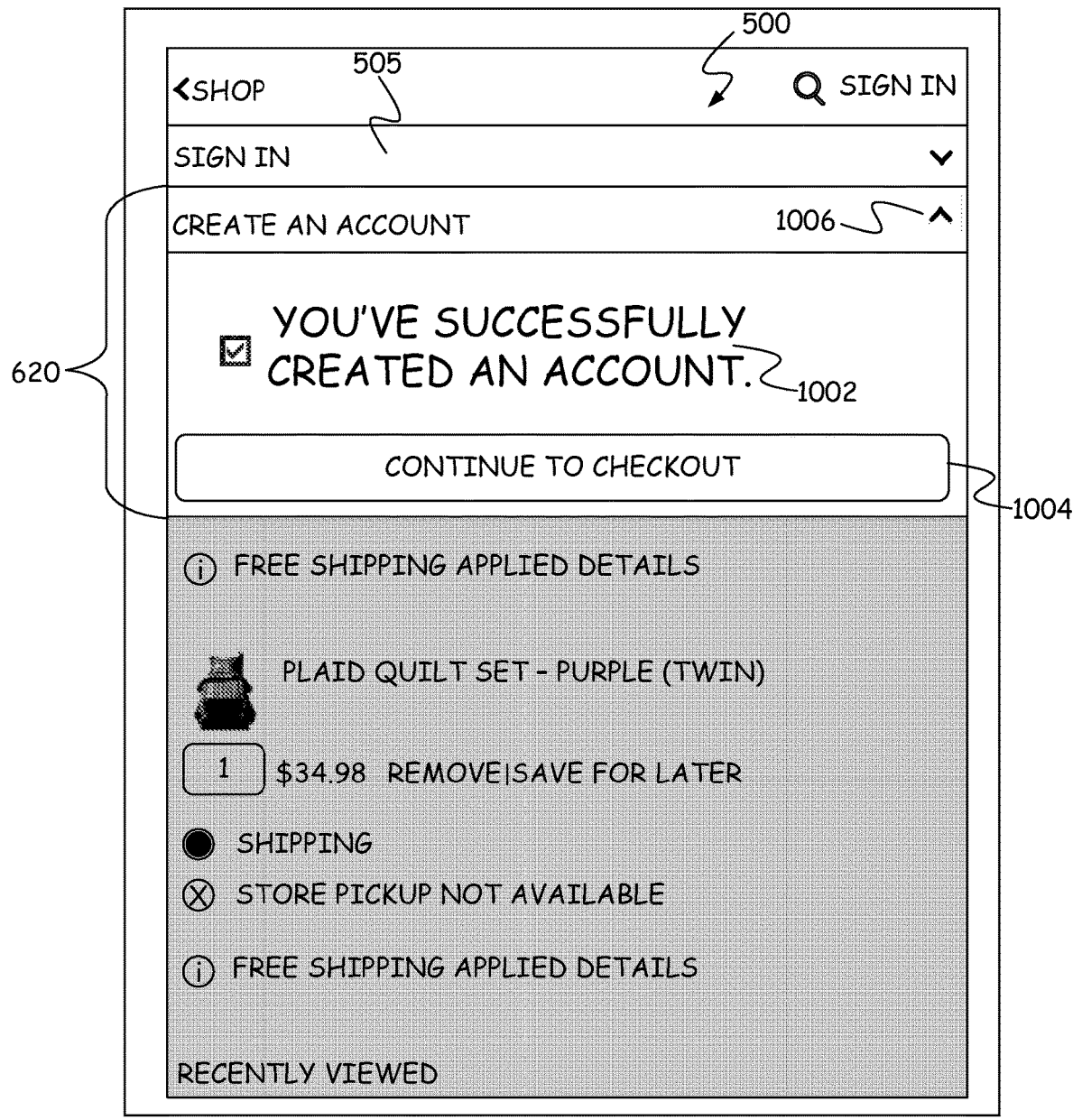
FIG. 10 provides an example of the user interface of FIG. 6 providing a success message in creating an account.

If at step 710, server 206 was able to create a new account, backbone code 210 receives an indication that the user account was created and in response modifies DOM 213 at step 716 to hide the create account input boxes 600, 602 and 604, CREATE AN ACCOUNT button 610, and offer selection box 608. At step 718, backbone code 210 displays within overlay 500 an indication that the user account was successfully created by showing a previously hidden success message and a previously hidden checkout control or button within overlay 500. In other words, backbone code 210 makes the previously hidden indication that a user account was successfully created visible. FIG. 10 provides an example of overlay 500 with the create account input boxes and create account button hidden and the previously-hidden success message 1002 and previously-hidden CONTINUE TO CHECKOUT control or button 1004 made visible. Note that the success message is displayed within overlay 500 and overlay 500 has not been closed. In addition, the underlying shopping cart page that is partially visible in semi-transparent region 502 has not been reloaded at step 718. A control 1006 is also provided for closing create account accordion 620. If control 1006 is selected, an animation is displayed that closes create account accordion 620 and thereby hides the indication that the user account was successfully created while continuing to display overlay 500.

Thus, as shown in FIG. 10, embodiments herein provide confirmation that the new account was created instead of simply returning to the shopping cart page without any confirmation of the creation of the new account. In addition, the confirmation is given within the existing overlay 500. As such, the user is not redirected to a separate page that indicates the successful creation of the account even though the small screen size of most mobile devices would make such redirection an easier choice for displaying the success message. By maintaining overlay 500 on the user interface, embodiments herein are less disorienting to the user and as a result, the user is better able to track where they are in the process of purchasing the goods in the electronic shopping cart.

Figure 11:
FIG. 11 provides an example of a reloaded electronic shopping cart after a user has created an account.

After showing the success message, backbone code 210 sets a timer at step 720. At step 722, backbone code 210 enters a loop waiting for either CONTINUE TO CHECKOUT control 1004 to be selected or for the timer to expire. When either one of these events occurs, backbone code 210 reloads the shopping cart user interface, also referred to as the base user interface, from the server at step 724. Thus, if CONTINUE TO CHECKOUT control 1004 is not selected before the timer expires, backbone code 210 will cause the electronic shopping cart user interface to be automatically reloaded from the server. When the electronic shopping cart user interface is reloaded from the server, retail server 206 merges anonymous shopping cart 240 in database 232 with a shopping cart 242 created for the new user account. During this merge, items that had been in anonymous shopping cart 240 will now be in user account shopping cart 242. At step 726, mobile device 202 receives the reloaded shopping cart page from retail server 206 and displays the reloaded shopping cart page such that the overlay 500 is hidden. FIG. 11 provides an example of a user interface 1100 showing the reloaded shopping cart page. In user interface 1100, there is no sign-in control, such as sign-in control 410 of the initial shopping cart page. The sign-in control is not needed in the reloaded shopping cart page because the user is now signed in. From user interface 1100, the user is able to select CHECKOUT control 1104 to proceed to set a shipping address and payment information for their purchase or is permitted to select shop control 1102, which will return the user to the previously displayed shopping page.

Figure 12:
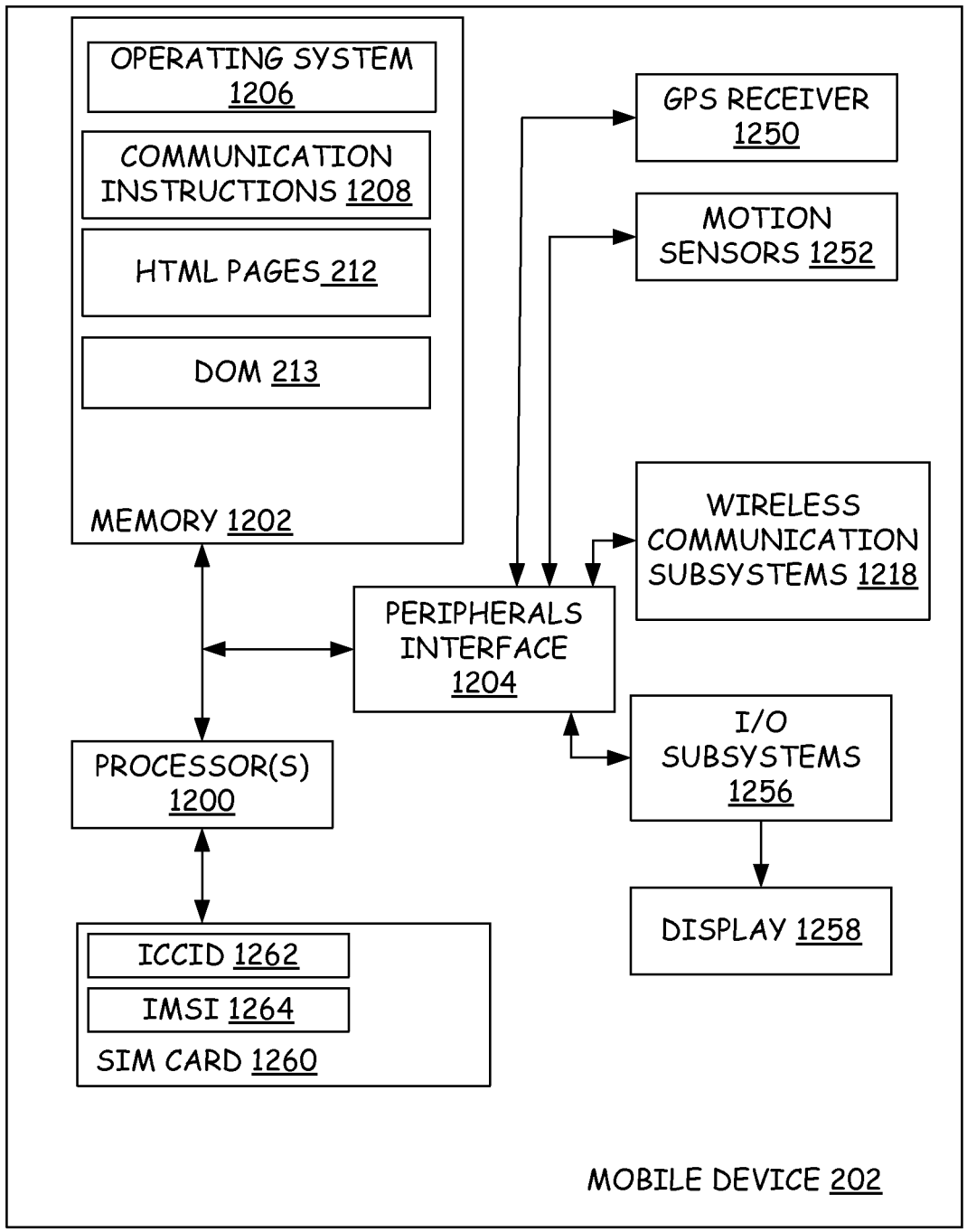
FIG. 12 provides a block diagram of a mobile device.

FIG. 12 illustrates a block diagram of mobile device 202. Mobile device 202 includes one or more processors 1200, such as a central processing unit or image processors, and a memory 1202. Processor(s) 1200 and memory 1202 are connected by one or more signal lines or buses. Memory 1202 can take the form of any processor-readable medium including a disk or solid-state memory, for example. Memory 1202 includes an operating system 1206 that includes instructions for handling basic system services and performing hardware-dependent tasks. In some implementations, operating system 1206 can be a kernel. Memory 1202 also includes various instructions representing applications that can be executed by processor(s) 1200 including communication instructions 1208 that allow processor 1200 to communicate through peripherals interface 1204 and wireless communication subsystems 1218 to a wireless cellular telephony network and/or a wireless packet switched network. Memory 1202 can also hold html pages 212 and document object models 213.

Peripherals interface 1204 also provides access between processor(s) 1200 and one or more of a GPS receiver 1250, motion sensors 1252, and input/output subsystems 1256. GPS receiver 1250 receives signals from Global Positioning Satellites and converts the signals into longitudinal and latitude information describing the location of mobile device 202. The position of mobile device 202 may also be determined using other positioning systems such as Wi-Fi access points, television signals and cellular grids. Motion sensors 1252 can take the form of one or more accelerometers, a magnetic compass, a gravity sensor and/or a gyroscope. Motion sensors 1252 provide signals indicative of movement or orientation of mobile device 202. I/O subsystems 1256 control input and output for mobile device 202. I/O subsystems 1256 can include a touchscreen display 1258, which can detect contact and movement or break thereof using any of a plurality of touch sensitivity technologies including, but not limited to capacitive, resistive, infrared and surface acoustic wave technologies as well as other proximity sensor arrays or other elements for determining one or more points of contact with display 1258. Other inputs can also be provided such as one or more buttons, rocker switches, thumb wheel, infrared port, USB port and/or pointer device such as a stylus.

Mobile device 202 can also include a subscriber identity module, which in many embodiments takes the form of a SIM card 1260. SIM card 1260 stores an ICCID 1262 and an IMSI 1264. ICCID 1262 is the Integrated Circuit Card Identifier, which uniquely identifies this card on all networks. IMSI 1264 is the international mobile subscriber identity, which identifies the SIM card on an individual cellular network. When communicating through wireless communication subsystems 1218, processor(s) 1200 can use identifiers 1262 and/or 1264 to uniquely identify mobile device 202 during communications. In accordance with many embodiments, SIM card 1260 is removable from mobile device 202 and may be inserted in other devices.

Figure 13:
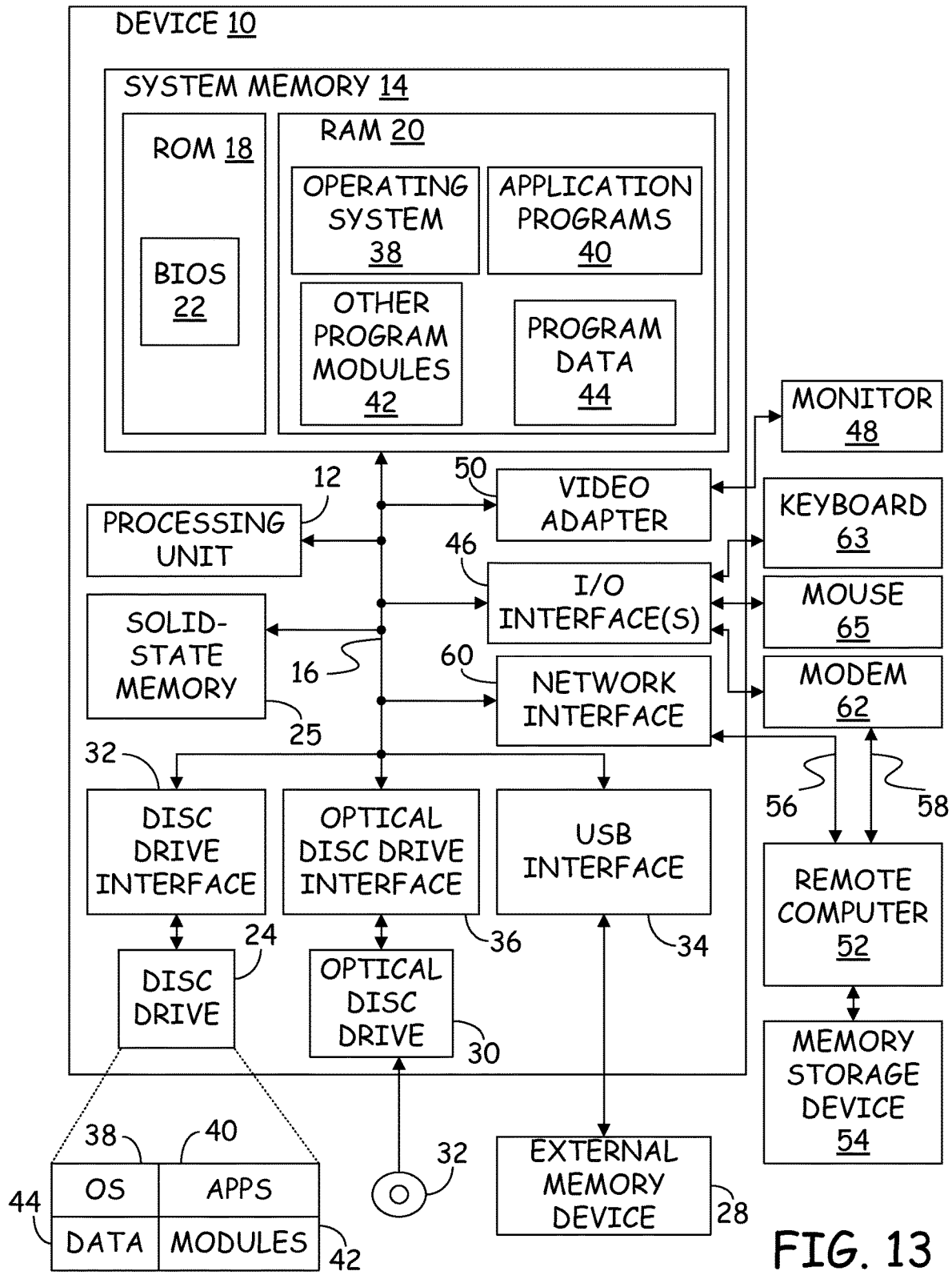
FIG. 13 provides a block diagram of a server device.

FIG. 13 provides an example of a computing device 10 that can be used as a client device, server device, data processing device or data warehouse device in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing retail server 206, for example. Program data 44 may include data such as user accounts 203, anonymous shopping cart 240 and user account shopping cart 242, for example.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 13. The network connections depicted in FIG. 13 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 13 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
    displaying a shopping cart user interface on a mobile device showing an electronic shopping cart for an anonymous user;
    receiving an input indicating a selection of a sign-in control;
    displaying an overlay over the shopping cart user interface such that a portion of the shopping cart user interface is displayed through a semi-transparent portion of the overlay and the overlay provides text inputs to receive information for creating a user account;
    receiving an indication that the anonymous user submitted information in the text inputs to create the user account;
    submitting the text inputs to a server;
    receiving an indication that the user account was successfully created;
    displaying within the overlay a message that the user account was successfully created; and
    receiving no further input over a set amount of time after displaying the message that the user account was successfully created, and in response automatically returning the user to the shopping cart user interface.

2. The computer-implemented method of claim 1 further comprising displaying a button in the overlay to return the anonymous user to the shopping cart user interface.

3. The computer-implemented method of claim 1 wherein returning the user to the shopping cart user interface comprises sending a request to a server to reload the shopping cart user interface such that the electronic shopping cart of the anonymous user is merged with an electronic shopping cart of the user account that was successfully created.

4. The computer-implemented method of claim 1 wherein displaying the message that the user account was successfully created comprises changing the overlay so that the text inputs are not rendered in the overlay.

5. The computer-implemented method of claim 1 wherein displaying the message that the user account was successfully created comprises altering an attribute of the message that the user account was successfully created so that the attribute changes from preventing the message that the user account was successfully created from being rendered in the overlay to causing the message that the user account was successfully created to be rendered in the overlay.

6. The computer-implemented method of claim 1 wherein while displaying the message that the user account was successfully created, displaying a control to change the overlay so that the message that the user account was successfully created is no longer rendered in the overlay while continuing to display the overlay.

7. A non-transitory computer-readable medium having computer-executable instructions stored thereon that cause a processor to perform steps comprising:
    receiving an input indicating a selection of a sign-in control while displaying a base user interface;
    displaying an overlay over the base user interface such that a portion of the base user interface is displayed through a semi-transparent region of the overlay and the overlay comprises:
        text inputs that are rendered to receive information for creating a user account, and
        a success message indicating that the user account was successfully created wherein the success message was downloaded with the base user interface and has an attribute that causes the success message to not be rendered;
    receiving an indication that a user submitted information in the text inputs to create the user account;
    submitting the information in the text inputs to a server;
    receiving an indication that the user account was successfully created;
    altering the overlay to not render the text inputs, to change the attribute for the success message so that the success message is rendered and causing a button to be rendered, wherein selection of the button causes the base user interface to be retrieved from the server; and
    setting a timer such that when the button is not selected before the timer expires, the base user interface is retrieved from the server automatically.

8. The non-transitory computer-readable medium of claim 7 wherein displaying the overlay further comprises displaying a control to change the displayed overlay so that the text inputs are not rendered.

9. The non-transitory computer-readable medium of claim 8 wherein altering the overlay comprises changing an attribute of a control so that the control is rendered, wherein selection of the control changes the attribute of the success message so that the success message is not rendered.

10. The non-transitory computer-readable medium of claim 7 wherein the base user interface was retrieved using a secure connection to the server.

11. The non-transitory computer-readable medium of claim 10 wherein the base user interface comprises a user interface displaying an electronic shopping cart of an anonymous user.

12. A method comprising:
    displaying an overlay over a base user interface such that a portion of the base user interface is displayed through a semi-transparent region of the overlay and the overlay comprises:
        text inputs rendered to receive information for creating a user account, and
        a success message indicating that the user account was successfully created wherein the success message was downloaded with the base user interface as part of the overlay and has an attribute that causes the success message to not be rendered;
    receiving an indication that the user account was successfully created;

altering the overlay such that the text inputs are not rendered, to change the attribute for the success message so that the success message is rendered, and to make a button visible, such that selecting the button causes the base user interface to be retrieved from a server; and setting a timer such that when the button is not selected before the timer expires, the base user interface is retrieved from the server automatically.

13. The computer-readable medium of claim 12 wherein displaying the overlay further comprises displaying a control to change the overlay so that the text inputs are not rendered.

14. The computer-readable medium of claim 13 wherein after altering the overlay, the overlay comprises a control to change the attribute of the success message so that the success message is not rendered.

15. The computer-readable medium of claim 12 wherein the base user interface comprises a user interface displaying an electronic shopping cart of an anonymous user.

* * * * *